Feb. 22, 1966 E. FROWEIN 3,236,933
ENCLOSED PRESSURE-GAS INSULATED BUSBAR SYSTEM
Filed Oct. 18, 1962
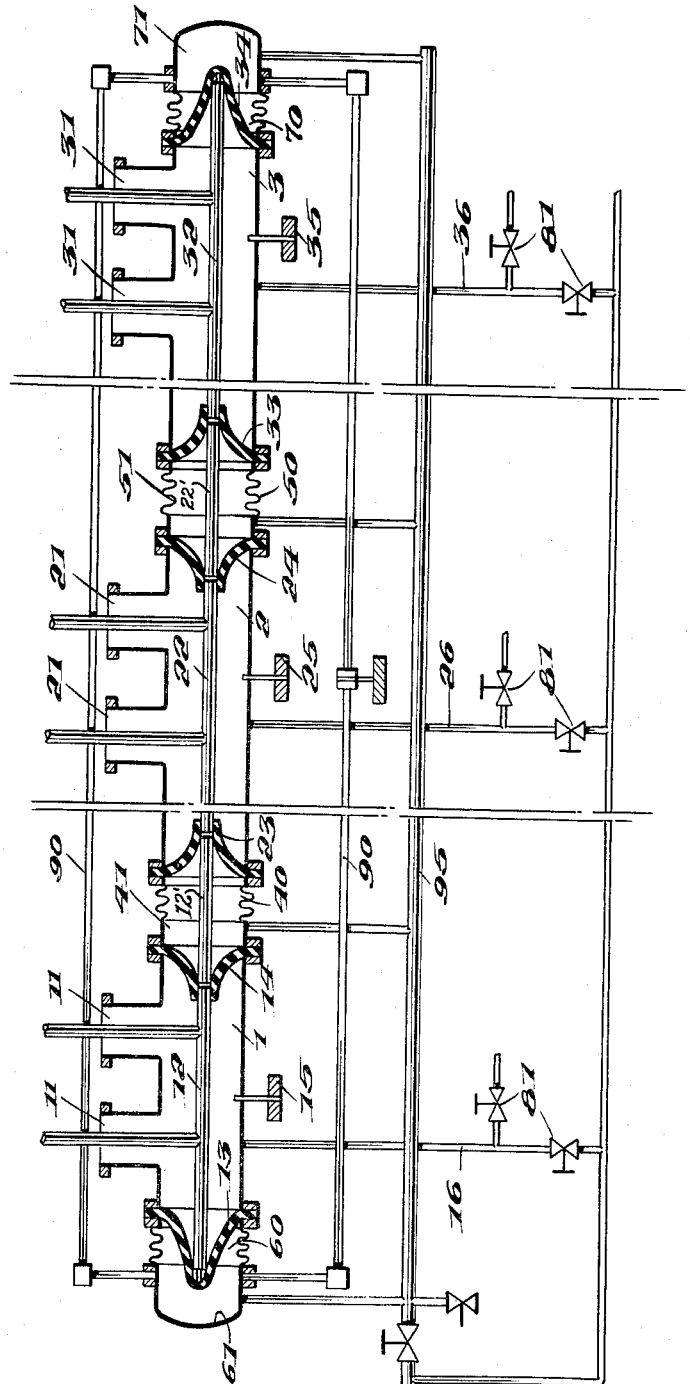
INVENTOR
Egbertus Frowein
Pierce, Schiffler & Parker
ATTORNEYS

United States Patent Office 3,236,933
Patented Feb. 22, 1966

3,236,933
ENCLOSED PRESSURE-GAS INSULATED
BUSBAR SYSTEM
Egbertus Frowein, Nussbaumen, Aargau, Switzerland, assignor to Aktiengesellschaft Brown, Boveri & Cie, Baden, Switzerland, a joint-stock company
Filed Oct. 18, 1962, Ser. No. 231,483
Claims priority, application Switzerland, Oct. 20, 1961, 12,127/61
1 Claim. (Cl. 174—13)

The present invention relates to busbar systems for electrical aparatus and in particular to busbars of the type which are enclosed and insulated by means of a pressure gas.

Enclosed pressure-gas insulated busbars are generally very long. Lengths of from 40 to 60 metres can occur. Such a busbar system has to be supported at various points. Suspensions such as are for instance used for steam pipes, cannot be considered here because enclosed or metal-clad installations are rigidly coupled together by means of isolators and circuit-breakers which are fixed to a frame. Considerable differences in temperature occur between the plant and the frame due to the current, and the casing can attain excess temperatures of 30 to 40°. This causes an additional thermal expansion of the casing, especially when it consists of aluminum. This makes it necessary to divide the casing by means of bellows in order to avoid inadmissible mechanical stresses. Moreover, it is also known to divide the busbar system into pressure-gas containers which are each closed for themselves. These compartments have to be made so that they can be emptied or filled separately as required. If there are bellows in such a compartment, then when it is emptied the neighboring compartments exert large forces on the installation and the frame. The consequence is that the installation and the frame are subjected to high mechanical stresses and this has to be avoided.

In accordance with the present invention an improved busbar system is provided, the busbar being divided by means of bellows and except at the ends by bulkhead insulators located at each side of the bellows which therefore results in a construction which is free from any appreciable mechanical stresses.

The invention is explained by means of a constructional example which is shown in the accompanying drawing, the single view of which is a longitudinal one with certain parts in central section.

The drawing shows a metal-clad pressure-gas insulated busbar system. This system comprises a plurality of axially aligned elongated tubular mechanically rigid sections 1, 2, 3 with outlet connection pipes 11, 21, 31 and busbar branches which lead to the apparatus of the installation. The busbar conductor sections 12, 22, 32 which extend axially within the compartments formed by the interior of the tubular sections 1, 2, and 3 are kept gas-tight by means of bulkhead insulators 13–14, 23–24, 33–34 which are located at the opposite ends respectively of the tubular metallic sections 1, 2 and 3 respectively. Furthermore, the tubular sections 1, 2 and 3 between these bulkheads are rigidly connected to the frame of the installation as indicated at 15, 25, 35. The busbar system is divided by means of bellows 40 and 50 and the intermediate bulkhead insulators 14, 23 and 24, 33 at each side of the bellows. The sections of the busbar within the bellows 40 and 50 are designated 12' and 22'. At the ends of the busbars, bulkhead insulators 13 and 34, respectively, as well as bellows 60 and 70 are provided. There are also cover plates 61 and 71 which replace the second bulkhead insulator at each end.

The spaces 41 and 51 in the bellows compartments and also the spaces behind the cover plates 61 and 71 are mutually interconnected and also connected by a common pressure-gas pipe 95 to the pressure-gas container 80. Furthermore, the busbar compartments established within the tubular sections 1, 2, 3 are connected by way of separate pipes 16, 26, 36 and also valves 81 to the pressure-gas container 80.

The end cover plates 61, 71 are mechanically joined together by means of tension rods 90. These tension rods 90 serve to interconnect the end caps or cover plates 61 and 71 rigidly with each other since very large separating forces arise in the axial direction because of the overpressure of the gas within the several compartments. The intermediate tubular sections 1, 2 and 3 are thus mechanically relieved of stress in an axial direction. In addition, the rigid connecting points 15, 25 and 35 on the frame of the installation are also relieved of forces acting in the axial direction.

With this arrangement it is possible to fill the compartments within the tubular sections 1, 2, 3 with pressure gas or to empty them as desired, without any excessive forces acting on the frame or installation. The individual tubular sections 1, 2 and 3 are free to expand under the influence of temperature fluctuations. Due to the simultaneous filling or discharging of the bellows compartments 41, 51, and the compartments behind the end cover plates 61, 71, by way of the pressure pipe 95, no additional forces occur which can act on the frame or parts of the installation. This is due to the fact since the pressure within all bellows units is the same, any increase or decrease in pressure within one bellows results in a corresponding and simultaneous increase or decrease in pressure within all other bellows thereby equalizing the opposing forces applied to opposite ends of the rigid tubular sections 1, 2 and 3.

I claim:

In a pressure gas insulated busbar system, the combination comprising a plurality of elongated tubular mechanically rigid sections arranged in axial alignment in substantially end-to-end relation, means rigidly connecting each of said tubular sections to a fixed support, each of said tubular sections including a laterally extending busbar branch outlet and being closed at its opposite ends by means of bulkhead insulators, bellows means interconnecting adjoinig bulkhead insulators of adjacent tubular sections, cover plates connected by bellows means to the bulkhead insulators at the opposite ends of said plurality of tubular sections, rigid tie rod means interconnecting said cover plates at the opposite ends of said plurality of tubular sections, a busbar extending axially through the compartments formed within said tubular sections and through the compartments formed within said bellows means interconnecting adjacent tubular sections, branches from said busbar extending laterally outward through said branch outlets, pipe means connecting all of said compartments formed within said bellows means in common to a pressurized gas line thereby to cause said compartments to be filled and emptied simultaneously, and valve controlled pipe means individual to and separately connecting each of said compartments formed within said tubular sections to a pressurized gas line thereby enabling the compartment formed within each tubular section to be filled and emptied independently of the compartments formed within the remaining tubular sections, said filling and emptying of said compartments within said tubular sections being effected in an essentially stress-free manner as regards said rigid connections between said tubular sections and said fixed support due to the action of said tie rod means in taking up the axially directed forces produced pneumatically on said end plates.

(References on following page)

References Cited by the Examiner

UNITED STATES PATENTS

| | | | |
|---|---|---|---|
| 325,984 | 9/1885 | Smith | 174—87 X |
| 2,024,957 | 12/1935 | Van De Graaff | 174—99 X |
| 2,191,071 | 2/1940 | Duttera | 174—21 X |

FOREIGN PATENTS

| | | |
|---|---|---|
| 944,665 | 5/1952 | France. |
| 70,011 | 5/1952 | Holland. |
| 393,930 | 3/1932 | Great Britain. |

JOHN F. BURNS, *Primary Examiner.*

JOHN P. WILDMAN, E. JAMES SAX, *Examiners.*